United States Patent
Fujimoto (10) Patent No.: US 7,792,327 B2
(45) Date of Patent: Sep. 7, 2010

(54) APPARATUS AND METHOD FOR DETECTING A ROAD BOUNDARY

(75) Inventor: Kazumi Fujimoto, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 964 days.

(21) Appl. No.: 11/601,264

(22) Filed: Nov. 17, 2006

(65) Prior Publication Data
US 2007/0127777 A1 Jun. 7, 2007

(30) Foreign Application Priority Data

Dec. 6, 2005 (JP) ............................. 2005-351783
Sep. 5, 2006 (JP) ............................. 2006-240495

(51) Int. Cl.
*G06K 9/00* (2006.01)
(52) U.S. Cl. ................. 382/104; 382/103; 382/107; 382/108
(58) Field of Classification Search ............... 382/103, 382/104, 107, 108
See application file for complete search history.

(56) References Cited

U.S. PATENT DOCUMENTS

| | | | | |
|---|---|---|---|---|
| 6,138,062 | A * | 10/2000 | Usami | 701/23 |
| 6,753,902 | B1 * | 6/2004 | Kashiwazaki | 348/119 |
| 2002/0005898 | A1 * | 1/2002 | Kawada et al. | 348/149 |
| 2003/0210807 | A1 | 11/2003 | Sato et al. | |
| 2006/0078165 | A1 | 4/2006 | Watanabe | |
| 2007/0080825 | A1 * | 4/2007 | Shiller | 340/903 |

FOREIGN PATENT DOCUMENTS

| | | |
|---|---|---|
| EP | 1227438 | 7/2002 |
| EP | 1705917 | 9/2006 |
| EP | 1817761 | 8/2007 |
| JP | 10-214326 A | 8/1998 |
| JP | 2004-56763 | 2/2004 |
| JP | 2005-209155 | 8/2005 |
| JP | 2006-092427 | 4/2006 |
| WO | 2006059201 | 6/2006 |

OTHER PUBLICATIONS

Patent Abstract of Japan Publication No. 2004-056763 dated Feb. 19, 2004 (1 page).
English Patent Abstract of JP10214326 from esp@cenet.com, published Aug. 11, 1998 (1 page).

(Continued)

*Primary Examiner*—Tom Y Lu
(74) *Attorney, Agent, or Firm*—Osha Liang LLP (57) ABSTRACT

A roadway boundary detecting apparatus has an imaging device for taking picture images ahead of a vehicle, a picture image memory connected to the imaging device for storing the picture images, and a control unit connected to the picture image memory. The roadway boundary detecting apparatus further has a program executable on the control unit for calculating speed information for pixels of consecutive picture images taken by the imaging device, detecting lowest point positions in regions in which pixels having speed components continuously exist along a vertical direction, based on the speed information for the pixels, and determining whether a straight line that connects the lowest point positions is a roadway boundary.

17 Claims, 10 Drawing Sheets

OTHER PUBLICATIONS

English Patent Abstract of JP2005209155 from esp@cenet.com, published Aug. 4, 2005 (1 page).

English Patent Abstract of JP2006092427 from esp@cenet.com, published Apr. 6, 2004 (1 page).

European Search Report for European Application No. 06125309.2-2218, dated Jun. 26, 2009 (10 pages).

Dailey, Daniel J., et. al., "An Algorithm to Estimate Mean Traffic Speed Using Uncalibrated Cameras," IEEE Transactions on Intelligent Transportation Systems, vol. 1, No. 2, Jun. 2000 (10 pages).

Takahashi, Arata, et al., "A Method for Robust Lane Marking Candidate Selection of Lane Recognition," Systems and Computers in Japan, vol. 31, No. 3, 2000 (8 pages).

Kasprzak, Wlodzimierz, et al., "Adaptive Road Recognition and Ego-state Tracking in the Presence of Obstacles," International Journal of Computer Vision 28(1), 5-26, 1998 (22 pages).

Office Action in European Application No. 06125309.2-2218, dated Feb. 23, 2010 (7 pages).

\* cited by examiner

United States Patent US 7,792,327 B2

APPARATUS AND METHOD FOR DETECTING A ROAD BOUNDARY

BACKGROUND OF INVENTION

1. Field of the Invention

The present application claims priority related applications under Japanese patent application Nos. JP2005-351783 filed Dec. 6, 2005 and JP2006-240495 filed Sep. 5, 2006 both co-owned at the time of application and both incorporated by reference in their entirety.

The present invention generally relates to a road boundary detecting apparatus for detecting an object on a road, and a method of detecting a boundary of a roadway being traveled by a vehicle.

2. Background Art

Japanese published patent application H10-214326A discloses a traveling control apparatus for a vehicle. This traveling control apparatus detects an edge from a picture image and thereby transforms the aligned edge row by means of a Hough transform to detect a roadway boundary. The Hough transform requires, for each detection of a point of the roadway boundary, drawing a curve in a parameter space, and adding an accumulated value of the points on the curve. The process has to be executed at all points that form the roadway boundary. U.S. patent application Ser. No. 11/146,041 filed on Jun. 7, 2005 (entitled "Motion Detection Apparatus and Motion Detection Method," Japanese Patent Application Laid-Open No. P2004-278250 filed Sep. 24, 2004 entitled "Motion Detector and Motion Detection Method," and Japanese Patent Application Laid-Open No. P2004-2793984 entitled "Apparatus and Method for Detecting Motion," disclose apparatuses and methods for detecting and calculating speed information of objects in motion, and are all hereby incorporated by reference in their entirety.

SUMMARY OF INVENTION

One or more embodiments of the present invention provides an apparatus and method capable of simplifying the process required in detecting a roadway boundary.

In one or more embodiments of the present invention, a roadway boundary detecting apparatus comprises an imaging device for taking picture images ahead of a vehicle, a picture image memory connected to the imaging device for storing the picture images, a control unit connected to the picture image memory. The roadway boundary detecting apparatus further comprises a program executable on the control unit for calculating speed information for pixels of consecutive picture images taken by the imaging device, detecting lowest point positions in regions in which pixels having speed components continuously exist along a vertical direction, based on the speed information for the pixels, and determining whether a straight line that connects the lowest point positions is a roadway boundary.

In one or more embodiments of the present invention, a method of detecting a roadway boundary comprises the steps of taking picture images ahead of a vehicle, calculating speed information for pixels of consecutive picture images taken by the imaging device, detecting lowest point positions in regions in which pixels having speed components continuously exist along a vertical direction, based on the speed information for the pixels, and determining whether a straight line, which connects the lowest point positions, is a roadway boundary.

In one or more embodiments of the present invention, a method of detecting a roadway boundary comprises taking a picture image ahead of a vehicle, calculating speed information of each pixel of the taken picture image, detecting a position of a lowest point in a region in which pixels, including speed components, continuously exist along the vertical direction, based on the speed information of each pixel, and determining whether a straight line that connects the detected lowest point positions is a roadway boundary of a road traveled by the vehicle.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers. Further, the use of "S" in the figures is equivalent to the use of "Step" in the detailed description below.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
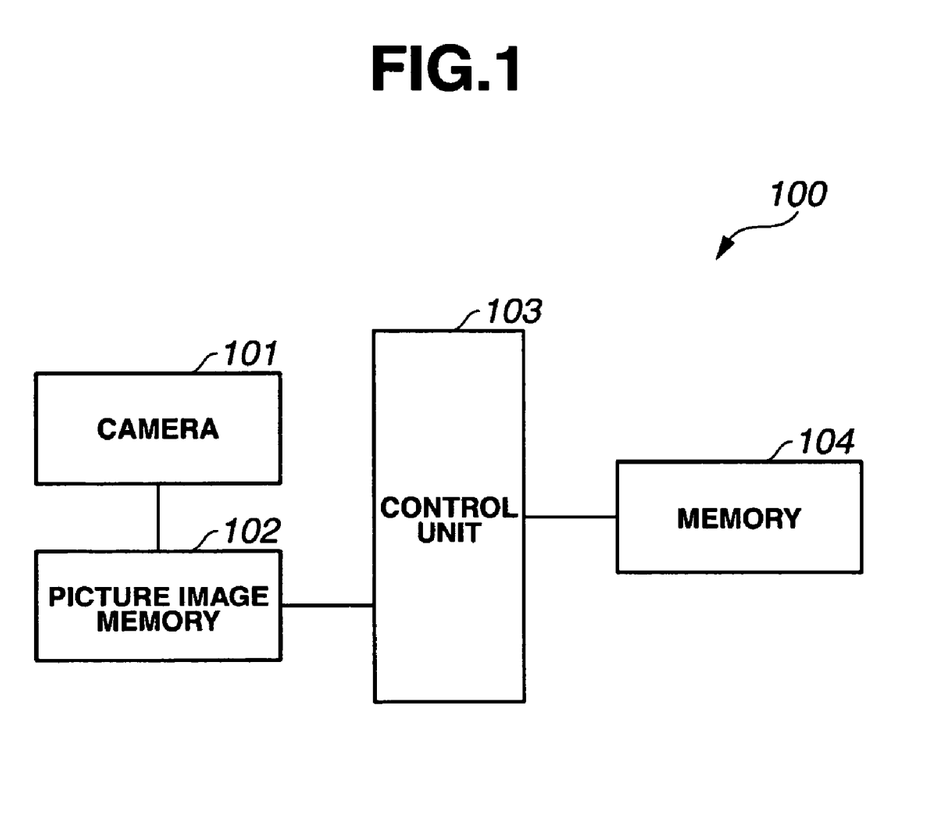
FIG. 1 is a block diagram showing an example configuration of a roadway boundary detecting apparatus according to one or more embodiments of the present invention.

FIG. 1 is a block diagram showing an example configuration of a roadway boundary detecting apparatus according to one or more embodiments of the present invention. A roadway boundary detecting apparatus 100 is mounted on a vehicle. The roadway boundary detecting apparatus 100 comprises a camera 101 for taking a picture image ahead of a vehicle, picture image memory 102 for storing the picture image taken by camera 101, control unit 103 for executing picture image process of the picture image which was taken by camera 101 and which was stored in picture image memory 102, and memory 104 for storing a count value of a pixel counter, which will be discussed in detail later.

Figure 2:
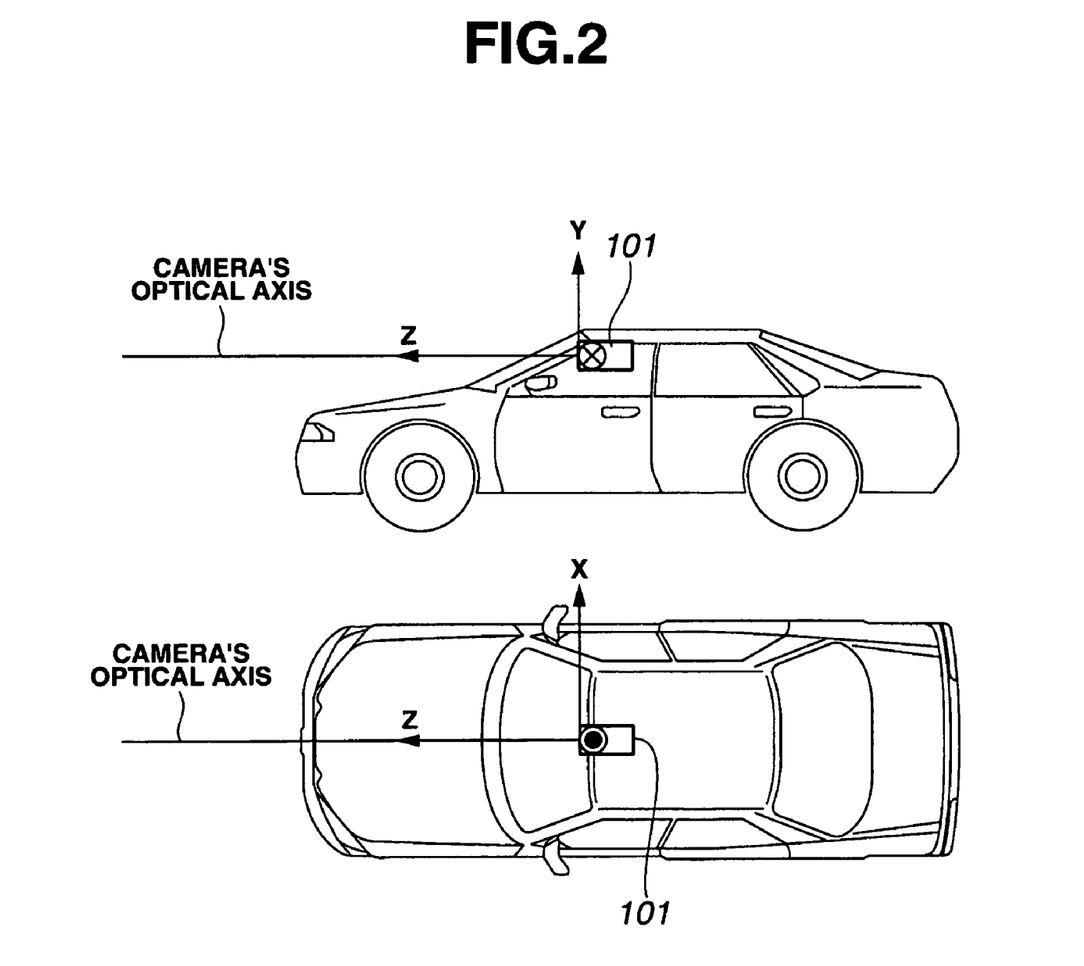
FIG. 2 shows an example placement of a camera in a vehicle according to one or more embodiments of the present invention.

Camera 101 is a camera including an imaging element, for example, CCD and CMOS. Camera 101 continuously takes picture images ahead of the vehicle, and outputs them to picture image memory 102 for each frame. Camera 101 is mounted at an upper frontal portion in a vehicle passenger compartment, as shown in FIG. 2. More specifically, camera 101 is mounted so that an optical axis Z is directed in a frontal direction ahead of the vehicle, a horizontal axis X of an imaging plane is parallel to the ground surface, and a vertical axis Y of the imaging plane is perpendicular to the ground surface. The continuous picture images taken by camera 101 are outputted to picture image memory 102 and stored therein.

Figure 3:
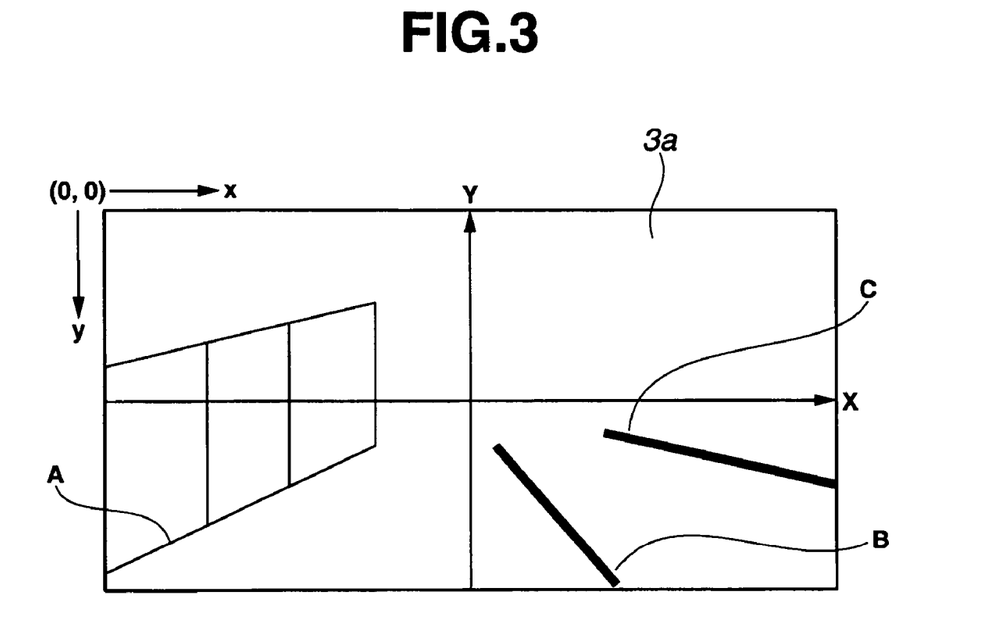
FIG. 3 shows an example of a picture image taken by a camera according to one or more embodiments of the present invention.

FIG. 3 shows an example of a picture image taken by camera 101 according to one or more embodiments of the present invention. A picture image 3*a* taken by camera 101 is represented by an x-y coordinate system (camera coordinate) in which the top left corner of the picture image is an origin, the x-axis extends from left to right, and the y-axis extends from top to bottom. In FIG. 3, the taken picture image 3*a* includes boundaries (roadway boundary) A, B, C of a roadway, such as a curb provided at the right or the left side of a road, a white line, a guardrail, an exterior wall, parked vehicle, and etc.

The control unit 103 executes a detection of a roadway boundary in the taken picture image 3*a* by executing an image process of the taken picture image 3*a* stored in picture image memory 102, as will be discussed later. For executing the detection of the roadway boundary in the taken picture image 3*a*, a moving speed of an object in the taken picture image 3*a* along the lateral direction is first detected, then a speed picture image, in which a moving direction and a moving speed of the object in the taken picture image 3*a* along the lateral direction is represented using a grade value (class mark), is generated.

More specifically, by reading the picture image taken by camera 101 from picture image memory 102 and by binarizing the picture image using a predetermined threshold with respect to the read picture image 3*a*, an edge of the object in the picture image is extracted. A center of the edge is accurately obtained by executing a thinning process with respect to each edge extracted in the picture image. The thinned edge is expanded so as to have a constant width, for example, of 3 pixels. By normalizing the extracted edge, it becomes possible to obtain an edge picture image in which each edge has an equivalent width.

Figure 4A:
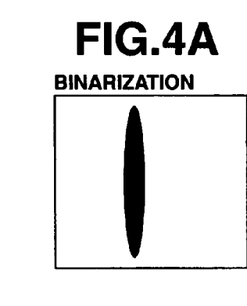
FIGS. 4A through 4F show an example of a process which is executed to obtain an edge picture image by normalizing the extracted edges according to one or more embodiments of the present invention.

FIGS. 4A through 4F show an example of a process executed to obtain the edge picture image by normalizing the above discussed extracted edge according to one or more embodiments of the present invention. First, a binarization process is executed as to the edge picture image. The binarization process is a process of setting a pixel at a position where an edge is detected ("edge detected position") as 1, and of setting a pixel at a position where an edge is not detected ("edge undetected position") as 0. By executing the binarization process, a binary picture image shown in FIG. 4A is produced.

Figure 4B:
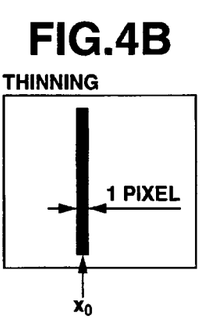

A thinning process is then executed in the produced binary picture image. The thinning process is a process of scaling down an edge width of the detected edge until reaching a predetermined pixel width. In FIG. 4B, a thinning is executed until an edge width of the edge becomes a predetermined width of 1 pixel. By thinning the edge until the edge width becomes a predetermined number of pixels, a center position, which becomes a center of the edge, is established. One of ordinary skill in the art will recognize that although a case of thinning the edge into a width of one pixel has been shown as an example, it may be thinned into any number of pixels.

An expanding process of expanding the edge width of the thinned edge is then executed. The expanding process is a process of expanding the edge width from the center position, established by the thinning process, toward the moving direction of the edge, and of expanding the edge width from the center position toward the opposite direction of the moving direction of the edge.

Figure 4C:
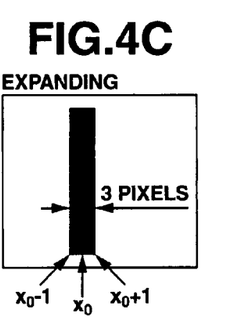
Figure 4D:
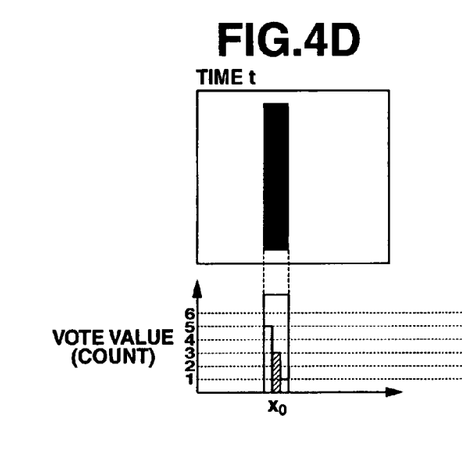

For example, in FIG. 4C, the edge width is expanded into 3 pixels, by expanding the thinned edge from the center position x0 of the edge toward the moving direction (a positive direction on the x-axis) by 1 pixel and by expanding the thinned edge from the center position x0 of the edge toward the opposition direction of the moving direction (a negative direction on the x-axis) by 1 pixel.

By executing the thinning process and the expanding process as discussed above, the edge width of the extracted edge picture image is uniformly normalized into a predetermined width in the moving direction of the edge.

A counting up process is then executed for the edge with the normalized edge width. The counting up process is a process of counting up a value at a memory address of an edge detected position, and of resetting a value at a memory address of an edge undetected position.

The counting up process of an edge will now be explained with reference to FIGS. 4C through 4F. In order to simplify the explanation, the assumption is made that the edge moves in the positive direction on the x-axis. Cases in which the edge moves in the negative direction on the x-axis, directions on the y-axis, or 2-dimensional directions can similarly be explained.

As shown in FIG. 4C, in a frame, the edge has a center position at a position x0, and is expanded from the center position by a pixel in the edge moving direction to a position x0+1, and from the center position by a pixel in the direction opposite the edge moving direction to a position x0−1.

Figures 4E, 4F:
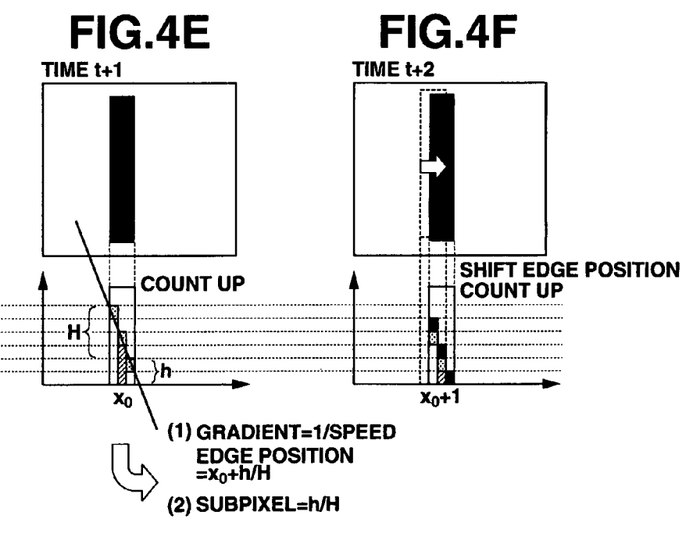

In such cases, count values of the edge detecting positions x0−1, x0, and x0+1 are counted up by 1, and the count values of the edge undetected positions are reset. For example, in FIG. 4D, since an edge is detected at the positions x0−1, x0 and x0+1 at time t, the count value is counted up at each position. Thus, the count value of position x0+1 is 1, the count value of position x0 is 3, and the count value of position x0−1 is 5. Since the edge did not move at time t+1, as shown in FIG. 4E, the edge is detected at each of positions x0−1, x0 and x0+1, and the count values of positions x0−1, x0 and x0+1 are each counted up by 1. Thus, the count value of position x0+1 becomes 2, the count value of position x0 becomes 4, and the count value of position x0−1 becomes 6.

Further, as shown in FIG. 4F, at time t+2 the edge is shifted in the positive direction of the x-axis by one pixel, and the edge is therefore detected at positions x0, x0+1 and x0+2. Accordingly, the count values at the edge detected positions x0, x0+1 and x0+2 are counted up, and the count value at the edge undetected position x0−1 is reset. As a result, as shown in FIG. 4F, the count value of position x0+2 becomes 1, the count value of position x0+1 becomes 3, and the count value at position x0 becomes 5. Further, the count value of the edge undetected position x0−1 is reset, and therefore becomes 0. In this way, the count values of the edge detected positions are counted up, and the count values of the edge undetected positions are reset.

In FIGS. 4A through 4F, although count values were detected at three positions of a center position (x0) of the edge, a position (x0+1) shifted by one pixel from the center position in the edge moving direction, and a position (x0−1) shifted by one pixel from the center position in the direction opposite the edge moving direction, as long as a gradient of the count value, to be discussed later, is obtained, the count values may be detected at any number, two or more, of positions along the edge moving direction.

If a frame rate is set at a sufficiently high value as compared with an edge moving speed, the edge is detected at the same position several times in consecutive frames. For example, in the example of FIGS. 4A through 4F, at position x0, the edge is detected twice, at time t and time t+1. Accordingly, when the count value is counted at the position where the edge is detected, the count value becomes equal to the time (number of frames). Specifically, the minimum count value h in the count values of the edge represents the number of frames in which the edge exists at the same position, once the edge has moved.

Next, a moving speed, a moving direction, and a position of the edge are calculated.

First, the gradient of the count values in the moving direction is calculated. Based on the gradient, the moving speed, the moving direction, and the position of the edge are calculated. For example, in FIG. 4E, the count values of positions x0−1, x0 and x0+1 are 6, 4, and 2, respectively. Accordingly, by subtracting the count value 2 of position x0+1 from the count value 6 of position x0−1, the gradient of the count value is calculated as H =(6−2)=4. Since here, H={(the elapsed time period from a moment the edge moved to position x0−1 to the present moment)−(the elapsed time period after the edge moved to position x0+1)}, a time period (number of frames) it takes for the edge to pass the pixel of position x0 is hereby calculated. Accordingly, obtaining the gradient H of the count value is obtaining the number of the frames required for edge to pass one pixel, and thus, based on the gradient H of the count value, the moving speed 1/H of the edge can be calculated.

FIG. 4E shows that 4 frames were required to move one pixel, and therefore the moving speed of the edge is calculated as ¼ (pixel per frame). Similarly, in FIG. 4F, H =(5−1)=4 is also obtained, and therefore, the moving speed of the edge is ¼ (pixel per frame).

The moving direction of the edge is determined from the magnitude of the count value. A count value of a position at which an edge is newly detected after a movement of the edge is 1, and is the smallest of the count values of the respective positions. Accordingly, the count value of the position at a side in the direction in which the edge moves ("edge moving direction") is small, and the count value at a side in the direction opposite the edge moving direction is large. From this, the moving direction of the edge can be determined.

Further, if a frame rate is set at a sufficiently high value as compared with a moving speed of the edge, the detected object can be assumed to move with constant speed. The minimum count value h in the count values of the present positions represents the amount of time the edge is detected at the same position, or how many frames the edge stays at the same position, after the edge moves.

Because of the above, when the center position of the edge is established as x0, the position of the edge is obtained by:

Edge position=x0+h/H.

For example, in FIG. 4E, the speed of the edge is ¼ (pixel/frame). Since at time t+1 the edge is continuously detected at the same position for 2 frames, the magnitude of movement of the edge at time t+1 from position x0 is calculated by

[0.5 pixel=2(frame)×¼(pixel/frame)].

From the above, it becomes possible to count up the count value of the position at which the edge is detected, and to calculate the moving speed and the moving direction of the edge based on the gradient of the counted up count values.

Figure 5:
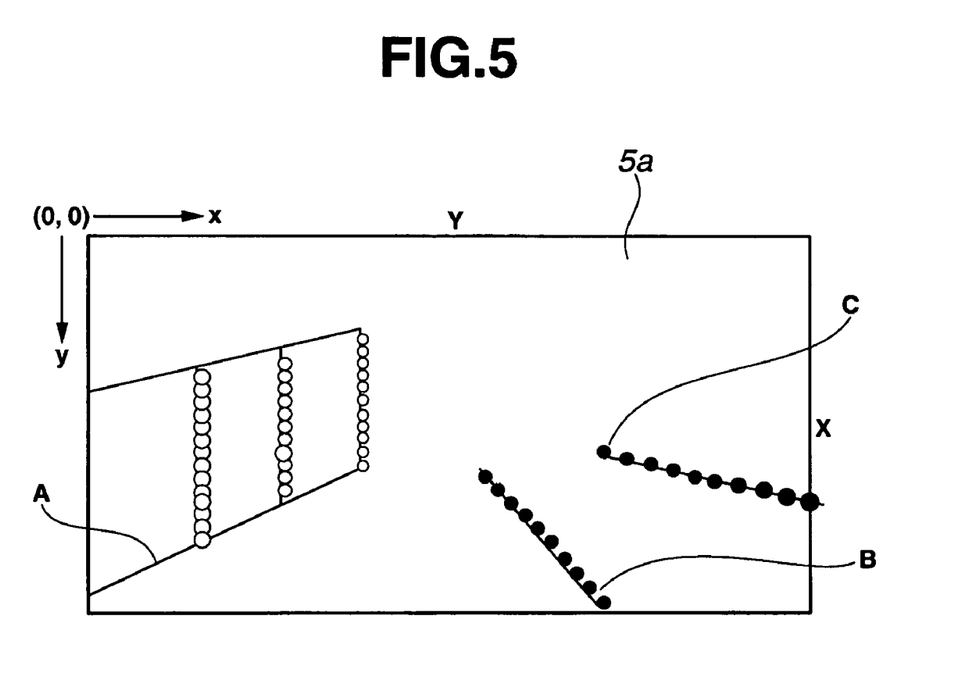
FIG. 5 shows an example of a speed picture image according to one or more embodiments of the present invention.

A speed picture image is produced, in which the speed information of an object in the taken picture image 3a that is calculated by the above process is represented by a predetermined class mark. In one or more embodiments, the pixels at which speed components are detected are represented by circles in the speed picture image 5a, as shown in FIG. 5. The circles function as class marks of the speed information, where the circles become larger as the moving speed of the pixels become higher. Further, the moving direction is expressed by representing a speed directed to the right hand side as a black circle and by representing a speed directed to the left hand side as a white circle. That is, in FIG. 5, speed directed to the right hand side of the picture image is detected from the roadway boundaries B and C located at the right hand side of the roadway, and a speed directed to the left hand side of the picture image is detected from the exterior wall A located at the left hand side of the roadway.

Figure 6:
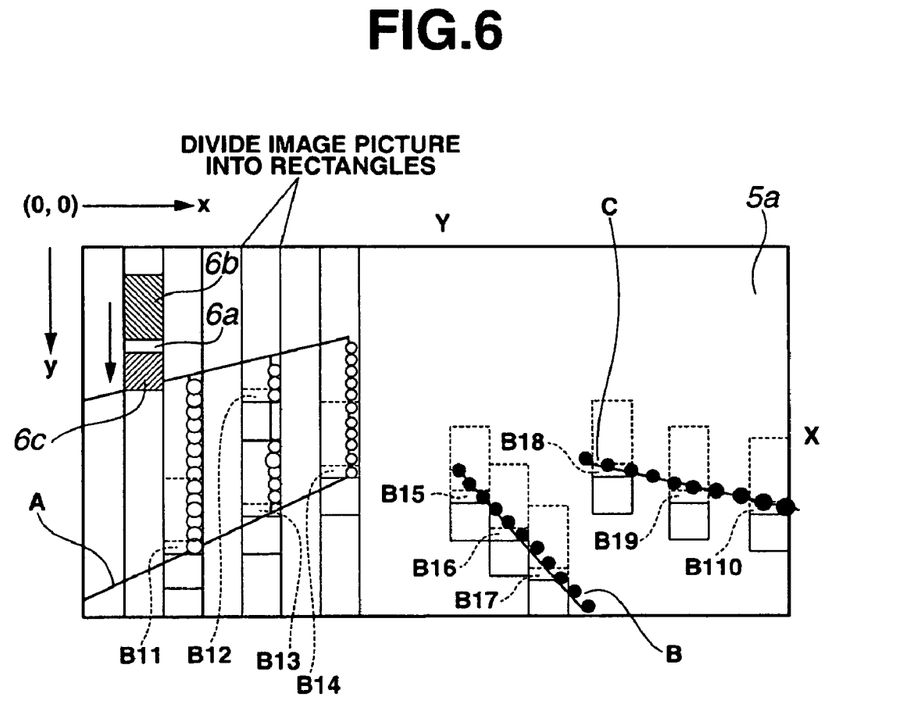
FIG. 6 shows an example where a region for detecting roadway boundary is set on the speed picture image according to one or more embodiments of the present invention.

Next, one or more roadway boundary detecting regions are established for detecting a roadway boundary in the calculated speed picture image 5a. More specifically, as shown in FIG. 6, by defining a plurality of rectangular regions on the speed picture image 5a, the speed picture image is divided into the respectively defined rectangular regions. For each rectangular region, points that form roadway boundaries in the speed picture image 5a are detected.

The points forming the roadway boundary are detected as points located at the lowest portions ("lowest point") of the rectangular regions in which pixels having speed components consecutively exist. Therefore, each rectangular region is scanned from a lower portion of the picture image toward an upper portion of the picture image. If, within a rectangular region, pixels having speed components consecutively appear for at least threshold T1, it is determined that an object forming the roadway boundary exists, and the lowest point thereof is detected. For facilitating the process in the present embodiment, for each rectangular region, a point forming a roadway boundary, that is, a line including the lowest point, is detected. In other words, when a line including a pixel having a speed component consecutively exists for at least a predetermined threshold T1, it is determined that there exists an object forming the roadway boundary. Thus, the position having the lowest point is detected. By this process, the lowest point positions B11 through B110 in FIG. 6 are detected.

Next, in lines B11 through B110 which contain the lowest points detected in each rectangular region, X-coordinates of the width center points of the rectangular regions are established as the X-coordinates of the lowest points for each line, and the coordinate values Bp1 through Bp10 are calculated as representative coordinate values of the respective lowest points. Based on the calculated X-coordinate values Bp1 through Bp10 of the lowest points in the respective lines and the camera parameters of camera 101, 3-dimensional coordinate values RB1 through RB10, which are in actual space and which correspond to the respective lowest points, are calculated by triangulation. Here, the 3-dimensional coordinate values are calculated with the assumption that all of the lowest point positions are on the road surface.

Figure 7:
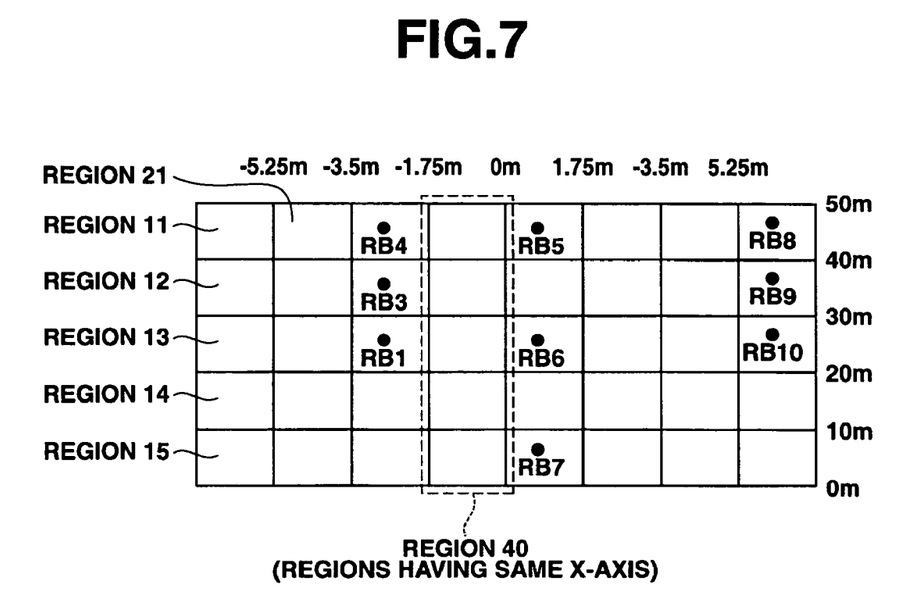
FIG. 7 shows an example of process for determining which region of a 2-dimensional region defining an X axis range and a Z axis range corresponds to a calculated 3-dimensional coordinate value according to one or more embodiments of the present invention.

It is then determined which 2-dimensional regions, defined by the X-axis range and the Z-axis range shown in FIG. 7, correspond to the calculated 3-dimensional coordinate values RB1 through RB10. For example, in the X-axis direction, eight regions are defined as follows: a region less than −5.25 m, a region between −5.25 m and −3.5 m, a region between −3.5 m and −1.75 m, a region between −1.75 m and 0 m, a region between 0 m and 1.75 m, a region between 1.75 m and 3.5 m, a region between 3.5 m and 5.25 m, and a region greater than or equal to 5.25 m. In the Z-axis direction, five regions are defined as follows: 0 m to 10 m, 10 m to 20 m, 20 m to 30 m, 30 m to 40 m, and 40 m to 50 m. Accordingly, 2-dimensional regions of 8×5 are defined, which are divided according to the regions established along the X axis direction and the Z axis direction. The defined regions may be usefully established in the order of meters.

In the 8×5 2-dimensional regions, names for distinguishing the regions are given, and each region is represented by a region ij using a column (X-axis region) i and a row (Z-axis region) j. For example, as shown in FIG. 7, the region in the first column and the first row is represented as region 11, the region at the first column and the second row is represented as region 12, and the region in the second column and the first row is represented as region 21. Further, a region having each of the regions in a column is represented as region i0, and a region having each of the regions in a row is represented as region 0j. For example, in the example shown in FIG. 7, a region including every region in the fourth column is represented as region 40.

Figure 8:
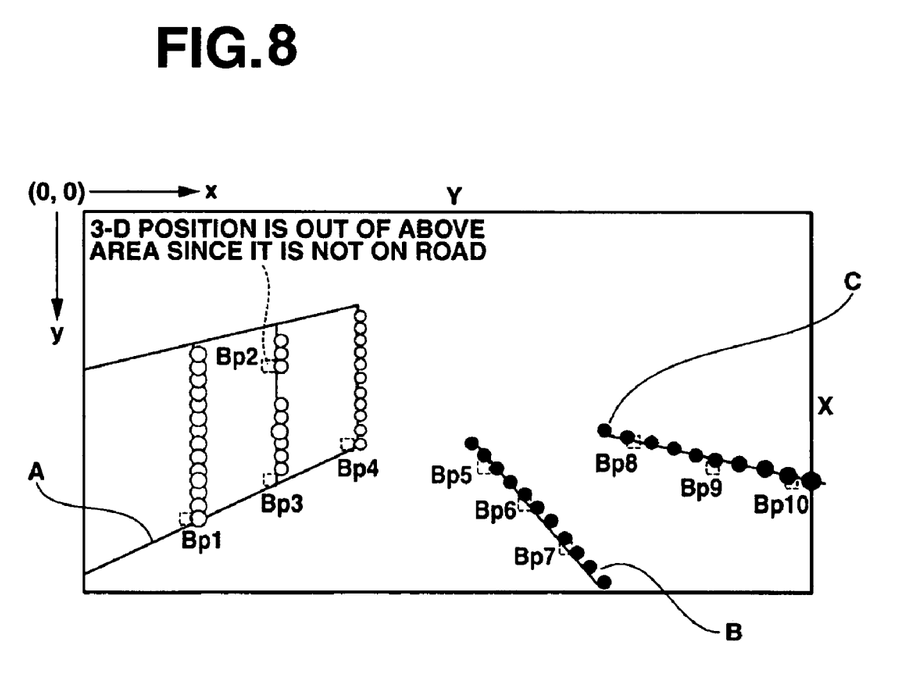
FIG. 8 shows an example of process for calculating a 3-dimensional position distribution of lowest point positions according to one or more embodiments of the present invention.

If the 3-dimensional coordinates of the lowest point positions calculated by the above discussed process are included in one of the 8×5 regions, the count value of a region including a lowest point position is incremented by 1, and the 3-dimensional positional distribution of the lowest point positions is calculated. For example, since the coordinate value Bp1 of the lowest point shown in FIG. 8 is included in region 33 shown in FIG. 7, the count value of region 33 is incremented by 1. Similarly, since the coordinate value Bp3 of the lowest point is included in region 32, and the coordinate value Bp4 of the lowest point is included in region 31, the count values of the respective regions are respectively incremented by 1. Since the coordinate value Bp2 of the lowest point in FIG. 8 is not included in any region shown in FIG. 7, the count value thereof is not incremented.

Figure 9:
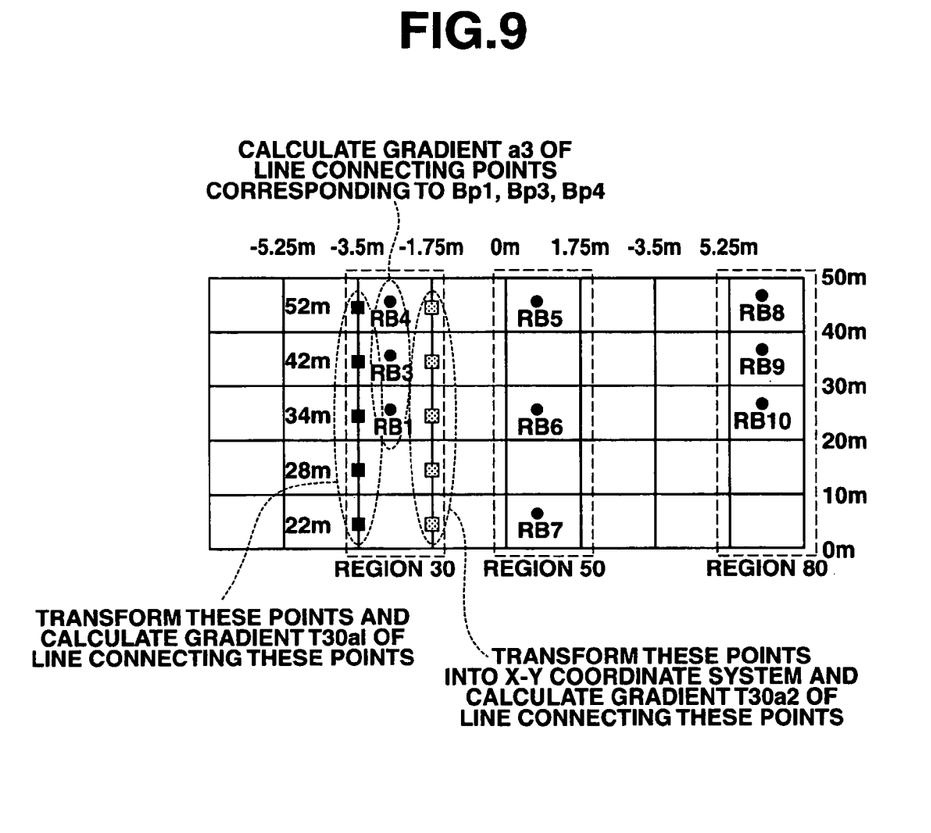
FIG. 9 shows an example of process for executing a determination as to whether a straight line representative of the roadway boundary exists in the respective regions according to one or more embodiments of the present invention.

FIG. 9 shows an example of the 3-dimensional positional distribution of the lowest point positions obtained as a result of the incrementing process of the count value with respect to each of the 8×5 regions. Control unit 103 extracts as a roadway boundary region the regions with high possibility that the roadway boundary exists therein, based on the 3-dimensional positional distribution of the lowest point positions shown in FIG. 9. That is, in the 3-dimensional positional distribution, a column having count value in a plurality of Z-axis regions with the same X-axis region is extracted as a roadway boundary region, in which a straight line indicative of the roadway boundary exists. In the example shown in FIG. 9, since the count value exists in a plurality of Z-axis regions within each of the regions 30, 50 and 80, the regions 30, 50 and 80 are extracted as roadway boundary regions.

Next, for each region extracted as a roadway boundary region, it is determined whether a straight line indicative of the roadway boundary exists in each of the extracted roadway boundary regions. More specifically, the gradient of the straight line is calculated by executing a regression analysis in the x y coordinate system on the basis of the lowest point positions (coordinate values of the lowest points) in each roadway boundary region. In the example shown in FIG. 9, in the region 30, the gradient a3 of the straight line is calculated by executing the regression analysis in the x y coordinate system based on the coordinate values Bp1, Bp3, Bp4 of the lowest points. In the region 50 and the region 80, the gradients a5 and a8 of the respective roadway boundary regions are similarly calculated. If the calculated gradient is within a predetermined range, it is determined that a straight line indicative of the roadway boundary exists in the extracted roadway boundary region.

That is, if the gradient an, which is calculated based on the coordinate values of the lowest points as discussed above, is within a range defined by a gradient Tn0a1 and a gradient Tn0a2, it is determined that a straight line Ln indicative of the roadway boundary exists in the extracted roadway boundary region. Here, Tn0a1 is calculated by transforming a left end coordinate of the X-axis region and a representative coordinate of each Z-axis region into the x y coordinate system and by executing the regression analysis thereof, and Tn0a2 is calculated by transforming a right end coordinate of the X-axis region and the representative coordinate of each Z-axis region into the x y coordinate system and by executing the regression analysis thereof. Here, a center value of the Z-coordinate range in the Z-axis region is used as a representative coordinate of the Z-axis region. By executing this process for all of the extracted roadway boundary regions, it is possible to detect the straight lines indicative of all roadway boundaries in the speed picture image 5a.

In the example shown in FIG. 9, in the extracted roadway boundary region 30, a gradient t30a1 is calculated by transforming coordinates (X, Z)=(−3.5, 45), (−3.5, 35), (−3.5, 25), (−3.5, 15) and (−3.5, 5) into x y coordinates and by executing the regression analysis thereof. Further, a gradient t30a2 is calculated by transforming coordinates (X, Z)=(−1.75, 45), (−1.75, 35), (−1.75, 25), (−1.75, 15) and (−1.75, 5) into x y coordinates and by executing the regression analysis thereof. Then, it is determined whether or not the calculated gradient a3 exists in a range defined by T30a1 and T30a2.

If the gradient a3 exists in the range defined by T30a1 and T30a2, it is determined that a straight line L3 indicative of the roadway boundary exists in extracted roadway boundary region 30. Similarly, in case of extracted roadway boundary region 50, if the gradient a5 exists in a range defined by T50a1 and T50a2, it is determined that the straight line L5 exists in extracted roadway boundary region 50. In case of extracted roadway boundary region 80, if the gradient a8 exists in a range defined by T80a1 and T80a2, it is determined that the straight line L8 exists in extracted roadway boundary region 80.

By this process, when it is determined that the straight lines exist in the roadway boundary regions (regions 30, 50, 80), by distinguishing that the straight line is a roadway boundary in the picture imaged taken by camera 101, it becomes possible to detect a roadway boundary from the picture image taken by camera 101.

Figure 10:
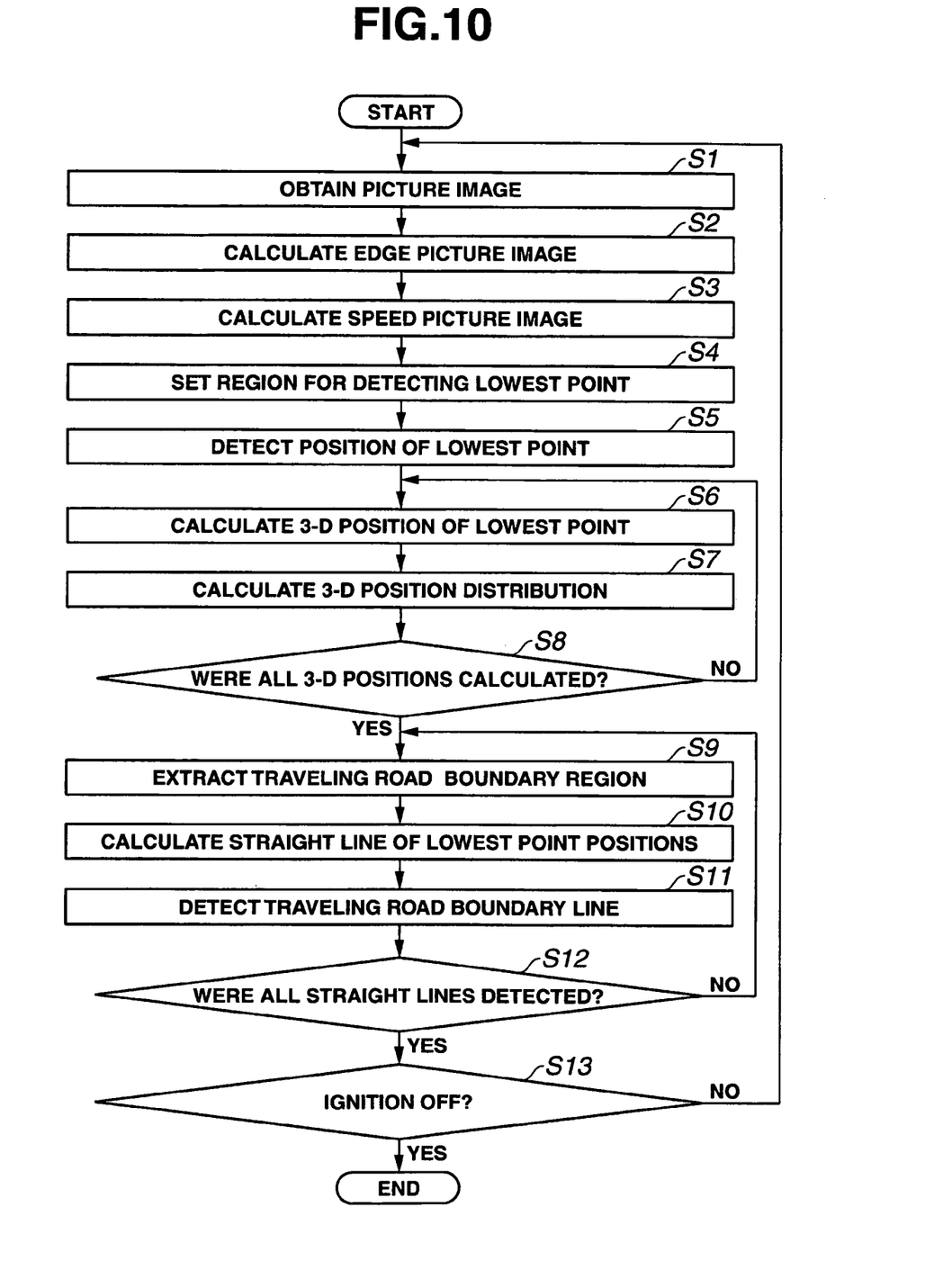
FIG. 10 is a flowchart showing a process of the roadway boundary detecting apparatus according to one or more embodiments of the present invention.

FIG. 10 is a flowchart showing a process of the roadway boundary detecting apparatus according to one or more embodiments of the present invention. The process shown in FIG. 10 may be executed as a program comprising steps S1-S10 that is started by control unit 103 when an ignition switch, not shown here, is turned on. For example, such a program may include a memory device for storing instructions executable by an apparatus, control unit and/or a CPU.

At step S1, a picture image ahead of the vehicle, which is taken by camera 101, is obtained from picture image memory 102. At step S2, an edge picture image, which is obtained by extracting an outline of an object in the taken picture image, is produced by executing a edge extracting process of the picture image. At step S3, speed information of the edge included in each pixel is calculated as discussed above, and the speed picture image 5a is calculated by transforming the calculated speed information into the predetermined class mark.

At step S4, rectangular regions for detecting the lowest point positions are established on the calculated picture image 5a. At step S5, the lowest point positions are detected by scanning the picture image in each rectangular region from a lower portion toward an upper portion and by determining whether or not a line having a pixel having a speed component continuously exists.

At step S6, by obtaining the representative coordinate values Bp1 through Bp10 of the detected lowest point positions, and by assuming that these points exist on the road surface, 3-dimensional positions corresponding to the representative coordinate values Bp1 through Bp10 in actual space are calculated using the camera parameter of camera 101. That is, the 3-dimensional coordinate values RB1 through RB10 are calculated. At step S7, it is determined which region of the 2-dimensional region defining the X-axis range and the Z-axis range corresponds to each of the calculated 3-dimensional coordinate values RB1 through RB10. If the corresponding region exists, the count value of the region is incremented by 1. If there is no corresponding region, the incrementing of the count value is not executed. Thus, a 3-dimension positional distribution of the lowest point positions is calculated.

At step S8, it is determined whether or not the 3-dimensional positions of all of the detected lowest point positions are calculated. When it is determined that the 3-dimensional positions of all of the detected lowest point positions have not been calculated, the program repeats the process from step S6. If it is determined that the 3-dimensional positions of all of the detected lowest point positions are calculated, the program proceeds to step S9. At step S9, from the obtained 3-dimensional position distribution, the regions in which count values exist in a plurality of Z-axis regions for the same X axis region are extracted as regions with a high possibility of having a roadway boundary.

At step S10, the gradient of the straight line is calculated by executing a regression analysis in the x y coordinate system, based on the lowest point in the extracted roadway boundary region. When the calculated gradient exists in the range defined by the gradient of the x y coordinate system, which is calculated based on the a left end coordinate of the X-axis region and the representative coordinate of each Z axis coordinate, and the right end coordinate of the X axis region and the representative coordinate of each Z axis coordinate, it is determined that the straight line representative of the roadway boundary exists in the roadway boundary region.

At step S11, within the extracted roadway boundary regions determined to have a straight line representative of the roadway boundary therein, a straight line connecting the lowest points is detected as a roadway boundaries in the picture image. At step S12, it is determined whether straight lines representative of all roadway boundaries have been detected from the extracted roadway boundary regions. When it is determined that the straight lines representative of all of the roadway boundaries have not been detected, the program repeats the process from step S9. Alternatively, when it is determined that the straight lines representative of all of the roadway boundaries have been detected, the program proceeds to step S13.

At step S13, it is determined whether or not the ignition switch of the host vehicle is turned off. If it is determined that the ignition switch is not turned off, the program returns to step S1 to repeat the process starting from step S1. Alternatively, if it is determined that the ignition switch is turned off, the program is terminated.

According to one or more embodiments of the present invention, one or more of the following advantageous operations and effects may be obtained.

(1) The regions for detecting the lowest point position are established on the speed picture image calculated based on the picture image taken by camera 101, and the points forming the straight line representative of the roadway boundary are detected. By this arrangement, roadway boundaries, such as a white line on a road, that are included in the picture image taken by camera 101 are invariably taken as an oblique line, because the roadway boundary is a straight line component parallel to the optical axis, and the oblique line tends to generate continued speed in the vertical direction. Further, even for a roadway boundary formed by contact points between a 3-dimensional object and a road surface, it is possible to detect continued speed in the height direction. Accordingly, detection of various kinds of roadway boundaries with high accuracy is possible.

(2) The detected lowest point positions are treated as points on the road surface, and the 3-dimensional positions thereof are calculated using the camera parameter of camera 101. By this arrangement, it becomes possible to execute a filtering process that filters a point that does not exist on the road surface but was detected as a lowest point, by causing it to largely deviate from the region defined by X-axis and Z-axis axis when the 3-dimensional position thereof is calculated. Therefore, it is possible to extract, with high accuracy, only the lowest points that form roadway boundaries.

(3) The determination is executed as to whether the straight line included in the extracted X Z coordinate roadway boundary regions is a straight line representative of a roadway boundary, by comparing the gradient calculated based on the lowest points and the gradient calculated based on the range defined by X-axis and Z-axis. By this arrangement, it is possible to eliminate false detection, which may not have been filtered by the filtering process of the 3-dimensional transformation, and extracting of the roadway boundary can thereby be reliably executed.

—Alternatives—

The roadway boundary detecting apparatus according to one or more embodiments of the present invention may be varied, for example, by one or more of the following.

(1) One or more embodiments of the present invention have been explained using the example of obtaining the edge picture image by executing the edge extracting processing for the taken picture image, updating the pixel counter of the pixel including the edge, and calculating the speed component of the edge in each pixel on the picture image based on the counter value of the corresponding pixel counter. However, the apparatus is not limited thereby, and may be arranged to calculate an optical flow using a commonly used method such as a gradient method or block matching.

(2) One or more embodiments of the present invention have been explained using the example of calculating the speed picture image 5a using the class mark as shown in FIG. 5. However, the invention is not limited thereby, and the speed picture image may be represented by other class marks, such as a speed picture image wherein the speed and the speed direction are represented in the form of a vector.

(3) One or more embodiments of the present invention have been explained using an example of mounting the roadway boundary detecting apparatus 100 on a vehicle. However, the invention is not limited to this, and the apparatus 100 may be mounted on any other mobile unit.

(4) One or more embodiments of the present invention have been explained using an example of detecting a white line or the contact point of the road surface with an exterior wall, the invention is not limited thereby, and other roadway boundaries can be detected, such as a boundary between a road surface and a curb, a guardrail or a parked vehicle, or a boundary between a road surface and another region (paddy, field, etc).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A roadway boundary detecting apparatus comprising:
    an imaging device for taking picture images ahead of a vehicle;
    a picture image memory connected to the imaging device for storing the picture images;
    a control unit connected to the picture image memory; and
    a program executable on the control unit for:
        calculating speed information for pixels of consecutive picture images taken by the imaging device;
        detecting lowest point positions in regions in which pixels having speed components continuously exist along a vertical direction, based on the speed information for the pixels; and
        determining whether a straight line that connects the lowest point positions is a roadway boundary.

2. The roadway boundary detecting apparatus according to claim 1, wherein
    the program further transforms the lowest point positions to 3-dimensional positions in actual space and calculates a positional distribution of transformed lowest positions;
    extracts a region with a high possibility of having the roadway boundary from the picture image, based on the positional distribution of the transformed lowest positions; and
    determines whether a straight line which connects lowest point positions is a roadway boundary, based on the extracted region.

3. The roadway boundary detecting apparatus according to claim 2, wherein the program further transforms the lowest point positions into 3-dimensional positions using an imaging parameter of the imaging device, with the assumption that all of the lowest point positions are located on a road surface.

4. The roadway boundary detecting apparatus according to claim 2, wherein the program determines whether a gradient of the straight line connecting the lowest point positions in the extracted region is in a predetermined range established for each region, and thereby determines whether the straight line connecting the lowest point positions in each region is the roadway boundary.

5. The roadway boundary detecting apparatus according to claim 1, wherein the roadway boundary includes at least one of a white line, a guardrail, a curb, a straight line connecting contact points between an exterior wall and a road surface, a straight line connecting contact points between a 3-dimensional object and the road surface, and a straight line connecting the road surface and a field.

6. A method of detecting a roadway boundary, comprising:
    taking a picture image ahead of a vehicle;
    calculating speed information of each pixel of the taken picture image;
    detecting lowest point positions in regions in which pixels including speed components continuously exist along the vertical direction, on the basis of the speed information of each pixel; and
    determining whether or not a straight line, which connects the detected lowest point positions, is a roadway boundary of a roadway traveled by the vehicle.

7. A method of detecting a roadway boundary, comprising the steps of:
    taking picture images ahead of a vehicle with an imaging device;
    calculating speed information for pixels of consecutive picture images taken by the imaging device;
    detecting lowest point positions in regions in which pixels having speed components continuously exist along a vertical direction, based on the speed information for the pixels; and
    determining whether a straight line, which connects the lowest point positions, is a roadway boundary.

8. A method of detecting a roadway boundary according to claim 7, further comprising the steps of:
    transforming the lowest point position to a 3-dimensional position in actual space and calculates a positional distribution of transformed positions;
    extracting a region with a high possibility of having the roadway boundary from the picture image, based on the positional distribution; and
    determining whether a straight line which connects lowest point positions is the roadway boundary, based on the extracted region.

9. A method of detecting a roadway boundary according to claim 8, further comprising the step of:
    transforming the lowest point positions into 3-dimensional positions using an imaging parameter of an imaging device, with the assumption that all of the lowest point positions are located on a road surface.

10. A method of detecting a roadway boundary according to claim 8, further comprising the step of:
    determining whether a gradient of the straight line connecting the lowest point positions in the extracted region is in a predetermined range established for each region, and thereby determines whether the straight line connecting the lowest point positions in each region is the roadway boundary.

11. A method of detecting a roadway boundary according to claim 7, wherein the roadway boundary includes at least one of a white line, a guardrail, a curb, a straight line connecting contact points between an exterior wall and a road surface, a straight line connecting contact points between a 3-dimensional object and the road surface, and a straight line connecting the road surface and a field.

12. A roadway boundary detecting apparatus comprising:
    an image taking section positioned on a vehicle for taking a picture image ahead of the vehicle, the picture image comprising a plurality of pixels;
    a speed information calculation section for receiving a picture image taken by the camera and calculating speed information of each pixel of the picture image;
    a lowest point detection section for receiving the speed information and detecting lowest point positions in regions of the picture image based upon speed components continuously existing in a vertical direction relative to the roadway at the detected lowest point positions; and
    a roadway boundary determining section for receiving the detected lowest point positions and for determining whether a straight line may be drawn connecting a plurality of the lowest point positions to thereby identify a continuous line of lowest point positions indicating a roadway boundary.

13. The road boundary detecting apparatus according to claim 12, further comprising:
- a 3-dimension positional distribution calculating section, wherein the 3-dimensional position detection section transforms the lowest point positions detected by the lowest point position detecting section to a 3 dimensional position on an actual space and calculates a positional distribution of the transformed positions;
- a roadway boundary region extracting section that extracts from the picture image an extracted region with a high possibility of including the roadway boundary of the roadway traveled by the vehicle, wherein the extracting is on the basis of the positional distribution calculated by the 3-dimension positional distribution calculating section; and
- wherein the determining section determines, on the basis of the extracted region, whether or not a straight line, which connects the lowest point positions detected by the lowest point position detecting section is a straight line formed of points on the roadway surface and whether the gradient of the straight line corresponds to a predetermined gradient to indicate that the straight line is the roadway boundary of the roadway traveled by the vehicle.

14. The roadway boundary detecting apparatus according to claim 13, wherein the 3dimension positional distribution calculating section transforms the lowest point positions into 3dimensional positions using a camera parameter of the imaging section, on the presumption that all of the lowest point positions detected by the lowest point position detecting section are located on the roadway surface.

15. The roadway boundary detecting apparatus according to claim 13, wherein the determining section determines that the straight line connecting the lowest point positions existing in the region is the roadway boundary of the roadway traveled by the vehicle when the gradient of the straight line connecting the lowest point positions in the extracted region, is within a predetermined range established by each extracted region.

16. The roadway boundary detecting apparatus according to claim 12, wherein the roadway boundary of the roadway traveled by the vehicle includes at least one of a white line, a guardrail, a curb, a straight line connecting contact points between an exterior wall and a roadway surface, a straight line connecting contact points between a 3 dimensional object and the roadway surface and a straight line connecting the roadway surface and other region.

17. (Currently Amendment) A roadway boundary detecting apparatus comprising:
- an imaging means for taking a picture image ahead of a vehicle;
- a speed information calculating means for calculating speed information of each pixel of the picture image taken by the imaging means;
- a lowest point position detecting means for detecting lowest point positions in regions in which pixels having speed components consecutively exist along the vertical direction, based on the speed information of each pixel; and
- a determining means for determining whether a straight line, which connects the lowest point positions, is a roadway boundary.

* * * * *